United States Patent Office

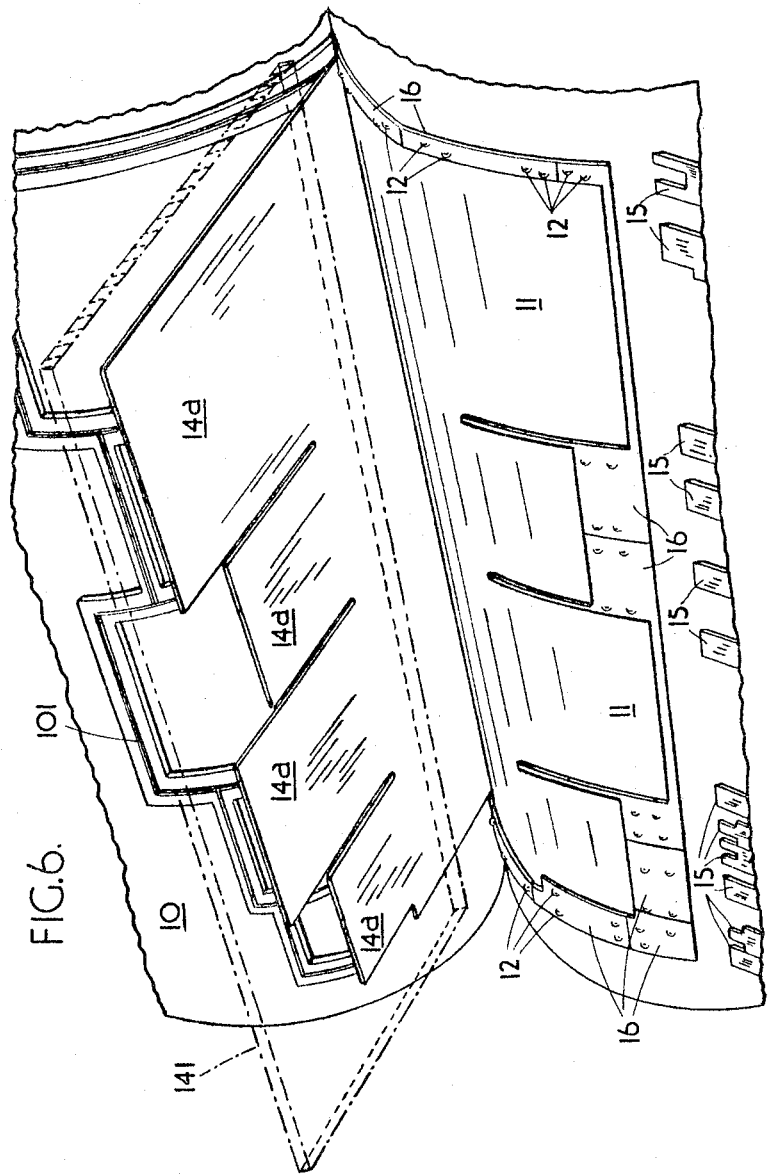

3,270,602
APPARATUS FOR CUTTING CARDBOARD AND ANALOGOUS FLEXIBLE MATERIAL
Kenneth Kirby, Keith Roland Tallett Kirby, and Colin Walter Kirby, Walsall, England, assignors to Kirby's (Engineers) Limited, Walsall, England, a corporation of Great Britain and Northern Ireland
Filed Jan. 21, 1965, Ser. No. 426,813
Claims priority, application Great Britain, Jan. 28, 1964, 3,520/64; Oct. 20, 1964, 42,656/64
7 Claims. (Cl. 83—102)

This invention has reference to rotary apparatus for cutting cardboard and analogous sheet material and is concerned particularly with rotary apparatus for this purpose of the kind in which the sheet material to be cut is passed into the nip of two positively driven rollers which effect the cutting of the sheet material during passage of the said material through the nip between the said rollers, the roller which carries the cutting "rule" being termed hereinafter the die carrying roller and the complementary roller the impression roller.

In the use of rotary cutting apparatus as aforesaid some difficulty is experienced in practice in getting rid of the "waste" after the performance of a cutting operation, and the present invention has for its object to provide means for facilitating the removal of waste material after the performance of such an operation.

Accordingly the invention consists of rotary apparatus for cutting cardboard and analogous flexible sheet material of the kind hereinbefore referred to in which the sheet material to be cut is passed through the nip between two positively driven rollers one of which, herein termed the die carrying roller, carries the cutting "rule" and the other of which serves as and is herein termed the impression roller and in which one or other of the said rollers or each of the said rollers is provided on the periphery thereof or on the periphery of an arcuate sheath adapted to be fitted thereon at those places which will correspond with the location of the "waste" resulting from the performance of a cutting operation with protuberant elements in the form of arcuate members with intermediate upstanding knife edged portion which will bite into the waste with a resilient progressive rolling action as cutting proceeds and carry away the waste material impaled thereon as the said die carrying and impression rollers recede in the course of a cutting operation.

The invention also resides in the provision of means for facilitating the stripping of the impaled waste material from the protuberant elements aforesaid as the relevant roller or the rollers rotate.

The invention also resides in rotary cutting apparatus for cardboard and analogous sheet material substantially as will be described hereinafter.

Embodiments of the invention will now be described with particular reference to the accompanying drawings wherein:

FIGURE 6 is a fragmentary view in perspective illustrative of the manner of locating the protuberant elements on the impression roller for the removal of waste material after the cutting of a blank and of the manner of the removal of waste by the said protuberant elements.

In the drawings like numerals of reference indicate the same or analogous parts in the several views.

Figure 1:
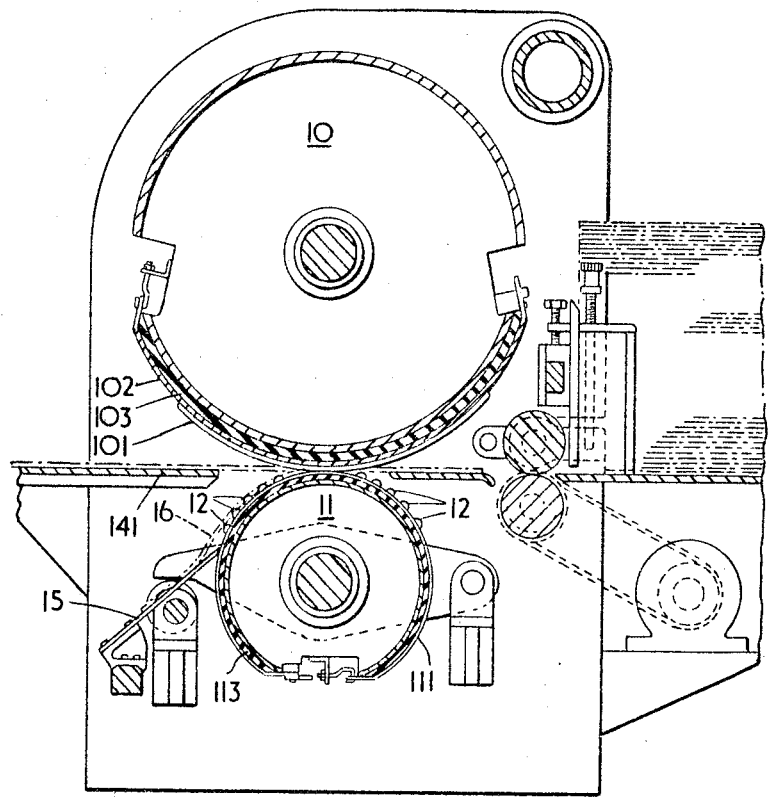
FIGURE 1 is a cross section illustrating the invention as applied to rotary cutting apparatus of known construction which in general is similar to that disclosed in our prior U.S. Patent No. 3,190,194 sufficient only of the apparatus being shown as is necessary to an understanding of the invention.
Figure 2:
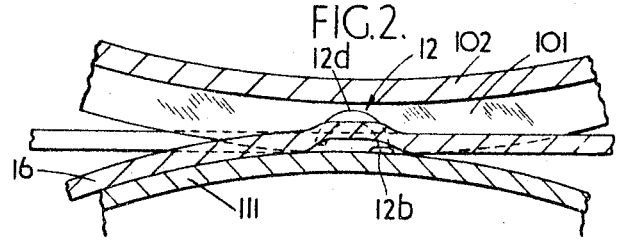
FIGURE 2 is a fragmentary view in side elevation and on an enlarged scale illustrating the action of the protuberant elements utilised in the apparatus depicted in FIGURE 1.
Figure 3:
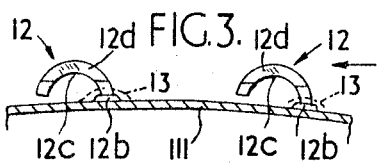
FIGURE 3 is a fragmentary view in side elevation of the protuberant elements as seen in FIGURE 2.
Figure 4:
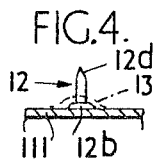
FIGURE 4 is a fragmentary view in end elevation of the protuberant elements as seen in FIGURE 3 looking in the direction of the arrows to the said figure.
Figure 5:
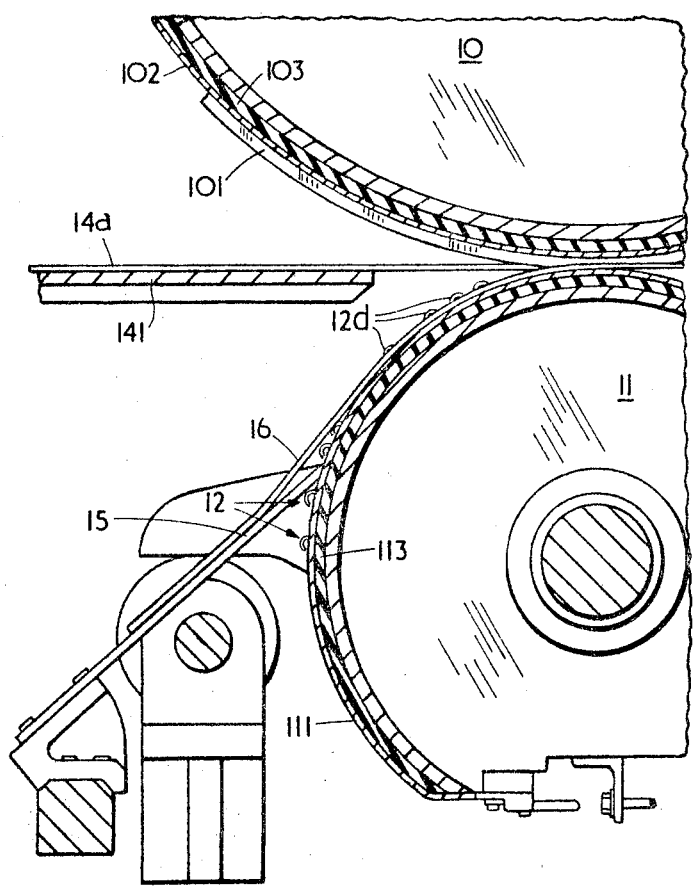
FIGURE 5 is a fragmentary view on an enlarged scale illustrative of the manner in which the waste material is impaled on and stripped from the protuberant elements illustrated in FIGURES 2 and 3.

According to the illustrated embodiment of the invention the cutting rule 101 is fixed to the periphery of an arcuate sheet member 102 which itself is detachably secured to the periphery of the die carrying roller 10 with an arcuate mat 103 of rubber or other material interposed between the arcuate sheet member 102 and the periphery of the die carrying roller 10.

Likewise the impression roller 11 is provided with a detachable and replaceable arcuate sheath 111 of sheet material with a mat 113 of rubber or other resilient material interposed between the sheath 111 and the periphery of the impression roller 11.

Fixed to the periphery of the sheath 111 are protuberant elements designated generically by the reference numeral 12 which are formed by securing to the sheath 111 preferably by spot welding the heads 12b of headed spikes and then bending the shanks of the spikes to an arcuate formation in the direction of rotation of the rollers 10 and 11 when in operation, with the protuberant arcuate intermediate portions 12c sharpened to a knife edge as at 12d so that as the impression roller 11 rotates during the performance of a cutting operation the knife edges 12d bite into the waste 16 with a resilient progressive rolling action and carry this away from the periphery of the die carrying roller 10 as the periphery of the impression roller 11 recedes therefrom.

If desired the heads 12b of the protuberant elements 12 may be secured to the sheath 111 by means of blobs 13 of adhesive such as that known in commerce as "Cataloy," see dotted lines.

Disposed adjacent to the periphery of the lower portion of the impression roller 11 and in advance of the said impression roller 11 is a plurality of parallel upstanding inclined blades 15 of resilient strip material which are located in positions such that as the waste 16 impaled on the protuberant elements 12 comes into contact therewith the waste 16 is stripped from the protuberant elements 12 and caused to be deposited onto a conveyor or transferred to a receptacle not illustrated for removal as and when convenient.

The cut blank 14a passes on to a table 141 the upper surface of which is located in the plane of the nip of the rollers 10, 11.

It is to be understood that the invention is applicable not only to rotary apparatus specifically intended for the cutting of cardboard but also to rotary apparatus for cutting analogous sheet material such for example as synthetic plastics sheet.

Further it will be appreciated that the invention may be applied to other forms of rotary cutting apparatus for cardboard and analogous sheet material other than that disclosed in our prior U.S. Patent No. 3,190,194.

The invention may be applied to existing rotary cutting and creasing apparatus without necessitating any material alteration thereto, especially in the case where the cutting plate is adapted to be detachable from the associated impression roller.

It is experienced that after the completion of a desired number of cutting operations the protuberant elements may be swept off the sheath 111 to which they are secured in the case of fixing by adhesive or spot welding by means of a heavy rod or analogous instrument.

We claim:

1. Rotary apparatus for cutting cardboard and analogous flexible sheet material incorporating a positively driven die carrying roller, cutting rule attached to the periphery of the roller in the pattern of the cutting desired to be effected, an impression roller, in the nip between which and the die carrying roller the sheet material to be cut is passed and protuberant arcuate members with intermediate upstanding knife edged portions fixed on one of the said rollers at those places on the periphery which will correspond with the location of the waste resulting from the performance of a cutting operation so that during the performance of a cutting operation the protuberant elements will bite into the waste with a resilient progressive rolling action as cutting proceeds and carry away the waste material impaled thereon as the die carrying and impression rollers recede in the course of a cutting operation.

2. Rotary apparatus for cutting cardboard and analogous flexible sheet material incorporating a positively driven die carrying roller, cutting rule attached to the periphery of the roller in the pattern of the cutting desired to be effected, an impression roller in the nip between which and the die carrying roller the sheet material to be cut is passed and protuberant arcuate members with intermediate upstanding knife-edged portions fixed on one of the said rollers at those places on the periphery which will correspond with the location of the waste resulting from the performance of a cutting operation so that during the performance of a cutting operation the protuberant elements will bite into the waste with a resilient progressive rolling action as cutting proceeds and carry away the waste material impaled thereon as the die carrying and impression rollers recede in the course of a cutting operation and means for stripping from the protuberant elements the waste impaled thereon as the rollers recede from the cut blank.

3. Rotary apparatus for cutting cardboard and analogous flexible sheet material as claimed in claim 1 in which the arcuate knife edged members are formed by fixing to the periphery of the relevant roller the heads of headed spikes the shanks whereof are then bent to an arcuate formation and in which after bending the intermediate portion of the shanks of the spikes are sharpened to provide upstanding knife edged portions which will bite into the waste during the progress of a cutting operation with a resilient progressive rolling action so that the waste becomes impaled thereon and carried away from the cut blank as the peripheries of the rollers recede from one another after the performance of a cutting operation.

4. Rotary apparatus for cutting cardboard and analogous flexible sheet material as claimed in claim 1 in which the protuberant elements are bent to an arcuate formation in the direction of rotation of the impression roller.

5. Rotary apparatus for cutting cardboard and analogous flexible sheet material as claimed in claim 1 in which the protuberant elements are secured to the relevant roller by means of adhesive.

6. Rotary apparatus for cutting cardboard and analogous flexible sheet material as claimed in claim 1 in which the protuberant elements are secured to the relevant roller by spot welding.

7. Rotary apparatus for cutting cardboard and analogous flexible sheet material as claimed in claim 1 in which the protuberant elements are secured to the relevant roller by riveting.

References Cited by the Examiner

UNITED STATES PATENTS

| | | | |
|---|---|---|---|
| 1,487,661 | 3/1924 | Langston | 83—103 |
| 1,983,708 | 12/1934 | Ruble et al. | 93—36 |
| 2,381,955 | 8/1945 | Hoffman et al. | 83—154 |
| 2,778,286 | 1/1957 | Walker | 93—36 |
| 2,888,860 | 6/1959 | Baumgartner | 93—36 |
| 3,117,499 | 1/1964 | Golding | 83—103 |
| 3,192,809 | 7/1965 | Crouch et al. | 83—102 |

FOREIGN PATENTS 881,173   11/1961   Great Britain.

WILLIAM W. DYER, JR., *Primary Examiner.*

L. B. TAYLOR, *Assistant Examiner.*